(12) United States Patent
Pare

(10) Patent No.: US 10,434,832 B2
(45) Date of Patent: Oct. 8, 2019

(54) SECURITY DEVICE FOR TRAILER HITCH

(71) Applicant: Andre Pare, St-Charles-de-Drummond (CA)

(72) Inventor: Andre Pare, St-Charles-de-Drummond (CA)

( * ) Notice: Subject to any disclaimer, the term of this patent is extended or adjusted under 35 U.S.C. 154(b) by 49 days.

(21) Appl. No.: 15/732,083

(22) Filed: Sep. 14, 2017

(65) Prior Publication Data
US 2019/0077205 A1 Mar. 14, 2019

(51) Int. Cl.
B60D 1/60 (2006.01)
E05B 73/00 (2006.01)
B60D 1/06 (2006.01)

(52) U.S. Cl.
CPC ............... B60D 1/60 (2013.01); B60D 1/06 (2013.01); E05B 73/00 (2013.01)

(58) Field of Classification Search
CPC combination set(s) only.
See application file for complete search history.

(56) References Cited

U.S. PATENT DOCUMENTS

| | | | | |
|---|---|---|---|---|
| 2,752,170 A * | 6/1956 | Eversole | ............... | B60D 1/60 280/502 |
| 3,391,555 A * | 7/1968 | Mamo | ............... | B60D 1/065 280/507 |
| 3,605,457 A * | 9/1971 | Foster | ............... | B60D 1/60 280/507 |
| 3,884,055 A * | 5/1975 | Vuillemot | ............... | B60D 1/60 280/507 |
| 4,925,205 A * | 5/1990 | Villalon | ............... | B60D 1/065 280/507 |
| 5,018,759 A * | 5/1991 | Villalon | ............... | B60D 1/065 280/507 |
| 5,681,053 A * | 10/1997 | Misukanis | ............... | B60D 1/60 280/507 |
| 6,149,181 A * | 11/2000 | Biederman | ............... | B60D 1/485 280/491.1 |
| 6,758,291 B1 * | 7/2004 | Koch | ............... | B60D 1/246 180/11 |
| 7,121,121 B2 * | 10/2006 | Wyers | ............... | B60D 1/065 70/14 |
| 7,246,810 B2 * | 7/2007 | Bussiere | ............... | B60D 1/60 280/507 |
| 7,699,336 B2 * | 4/2010 | Van Laere | ............... | B60D 1/60 280/507 |
| 9,855,804 B1 * | 1/2018 | Kirkconnell | ............... | B60D 1/28 |
| 10,144,256 B1 * | 12/2018 | Garcia | ............... | B60D 1/065 |

(Continued)

Primary Examiner — Tony H Winner
(74) Attorney, Agent, or Firm — Eric Fincham

(57) ABSTRACT

A security device for a trailer hitch which includes a ball receptor, the device comprising a base plate, a deflector secured to the base plate, the deflector having an aperture formed therein, the deflector having an inwardly directed upper portion, a cover hingedly connected to the base plate, the cover being movable between an open position permitting access to the ball receptor and a closed position denying access thereto, a locking device mounted to the cover, the locking device including a housing, a plunger mounted within the housing, the plunger being movable between an extended position and a retracted position, the plunger being spring biased to the extended position, and the locking device being secured such that the plunger enters the aperture when the cover is in a closed position.

7 Claims, 21 Drawing Sheets

(56) References Cited

U.S. PATENT DOCUMENTS

| | | | |
|---|---|---|---|
| 2004/0134242 A1* | 7/2004 | Wyers | B60D 1/065 70/14 |
| 2004/0211230 A1* | 10/2004 | Recknagel | B60D 1/60 70/34 |
| 2007/0144222 A1* | 6/2007 | Wyers | B60D 1/065 70/14 |
| 2009/0102159 A1* | 4/2009 | Van Laere | B60D 1/60 280/507 |
| 2010/0095717 A9* | 4/2010 | Wyers | B60D 1/065 70/14 |
| 2012/0182139 A1* | 7/2012 | Raines | B60D 1/015 340/431 |
| 2016/0039259 A1* | 2/2016 | Elliott | B60D 1/46 280/507 |
| 2018/0304708 A1* | 10/2018 | Pratt | B60D 1/06 |
| 2018/0333999 A1* | 11/2018 | Garcia | B60D 1/065 |

* cited by examiner

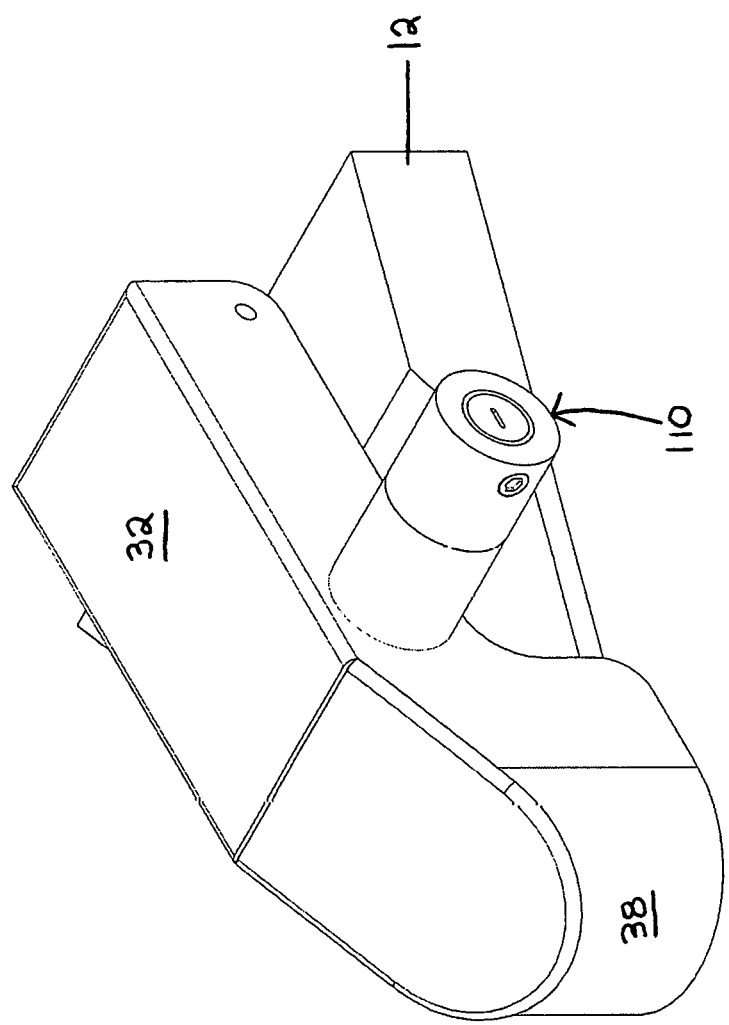

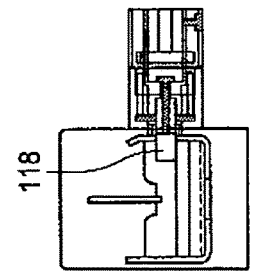
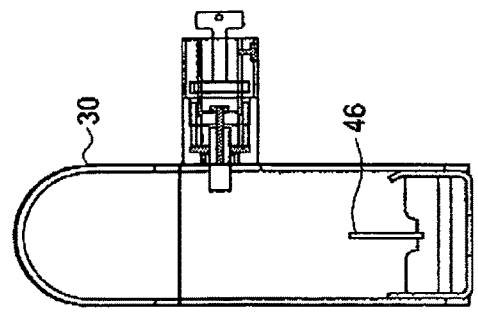
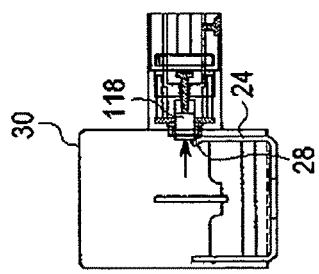
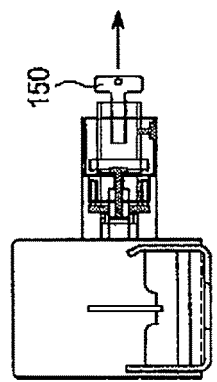
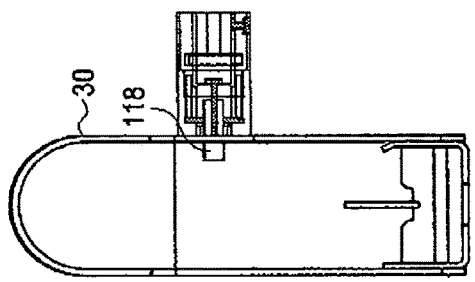
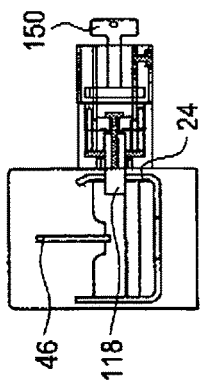

SECURITY DEVICE FOR TRAILER HITCH

FIELD OF THE INVENTION

The present invention relates to a security device, and more particularly, relates to a security device which may be utilized to secure trailer hitches and the like.

BACKGROUND OF THE INVENTION

It is well known in the art that many trailers utilize a ball type hitch which includes a socket for receiving a ball. As a result of the wide use of such arrangements, there are standards in the industry for the size of the components and there are now many vehicles which can be equipped with a trailer hitch ball which is capable of being secured to an unattended trailer. Such thefts are relatively common. As a result, obtaining insurance for the theft of a trailer is very difficult if a security device is not provided.

The problem arises even when the trailer is attached to its own vehicle. In order to prevent theft when unattended, cables and padlocks are typically used to provide a locking arrangement. However, chain cutters and the like can be used and/or the lock can usually be forced or picked.

It is known in the art that such a problem exists and there have been many proposals in the art for trailer hitch locks which can be secured to the trailer hitch coupler to prevent theft. Such devices must at the same time be easily secured and removable to allow the user to quickly attach and remove the lock.

SUMMARY OF THE INVENTION

It is an object of the present invention to provide a security device suitable for securing a trailer and which device is difficult to defeat and at the same time provides ease of use.

According to one aspect of the present invention, there is provided a security device for a trailer hitch which includes a ball receptor comprising a base plate, a deflector secured to the base plate, the deflector having an aperture formed therein, the deflector having an inwardly directed upper portion, a cover hingedly connected to the base plate, the cover being movable between an open position permitting access to the ball receptor, and a closed position denying access to the ball receptor, a locking device mounted to the cover, the locking device including a housing, a plunger mounted within the housing, the plunger being movable between an extended position and a retracted position, the plunger being spring biased to the extended position, and the locking device being located such that the plunger enters the aperture when the cover is in a closed position.

The security device of the present invention can be used in different situations. A trailer hitch or coupler is a mechanical device that connects a trailer to the hitch of the tow vehicle. The tow vehicle will typically have a hitch carrying a ball member while the trailer will have a mechanism for clamping around the hitch ball. Although it is known to use various arrangements, a common arrangement is the use of a lever or toggle to lock the coupler. In this arrangement, when the lever is moved to the locked position, the clamp is pulled up against the underside of the hitch ball. Trailer hitch couplers come in different sizes depending upon the trailer weight.

The security device of the present invention, as above mentioned, can be used in different situations. In a first situation, the security device is attached to the trailer hitch coupler when the trailer is unhitched from the towing vehicle. This prevents theft of the trailer by a person using an alternative tow vehicle to couple to the trailer.

A second situation wherein the security device is used is when the trailer is already hitched to the tow vehicle. This prevents an unauthorized third party from unhitching the trailer from the tow vehicle.

The security device, as above mentioned, includes a base plate which is secured to the trailer hitch coupler. It suffices to say that various means may be employed for securing the same.

The base plate will have an upwardly extending deflector secured thereto. Conveniently, the deflector may form a side wall which is secured to the base plate. A portion of the deflector has an inwardly directed upper portion to allow a plunger to be retracted as the plunger hits the inwardly directed upper portion. The lower portion of the deflector has an aperture formed therein to receive the plunger as will be described in greater detail hereinbelow.

A cover is hingedly connected to the base plate with the cover being movable between an open position and a closed position. In the open position, access is provided to the coupler mechanism, while in the closed position, access is denied.

The cover is hingedly connected to the base plate. The hinge arrangement is preferably one wherein the cover may be maintained in the open position without human intervention. Thus, a great number of arrangements can be utilized including one wherein the hinge and cover, when in the fully open position, require a greater than normal effort to close the cover. This may be achieved by the use of embossments or the like as is known in the art.

The cover is designed to receive a locking assembly. Preferably, the locking assembly is mounted in a side wall of the cover although alternative arrangements could be employed. The locking device consists of a housing with a plunger mounted within the housing. The plunger is movable between an extended position and a retracted position with the plunger being spring biased to the extended position. Preferably, the locking assembly includes a locking device which is of the pull-push type which, once a key is entered therein, an inner housing containing the plunger may be retracted. This will permit opening of the cover and access to the trailer hitch coupler. This also permits the device to function such that the cover can be moved to the closed and locked position without requiring use of the key.

The cover and associated components are preferably formed of a stainless steel material which is resistant to tampering through use of tools such as drills and the like.

BRIEF DESCRIPTION OF THE DRAWINGS

Having thus generally described the invention, reference will be made to the accompanying drawings illustrating embodiments thereof, in which:

FIG. 13 is a perspective view of the security device mounted on the trailer hitch;

FIGS. 14A to 14C illustrate the closing of the security device and a trailer hitch;

FIGS. 15A to 15C illustrate the opening of the security device;

DETAILED DESCRIPTION OF THE INVENTION

Figure 1:
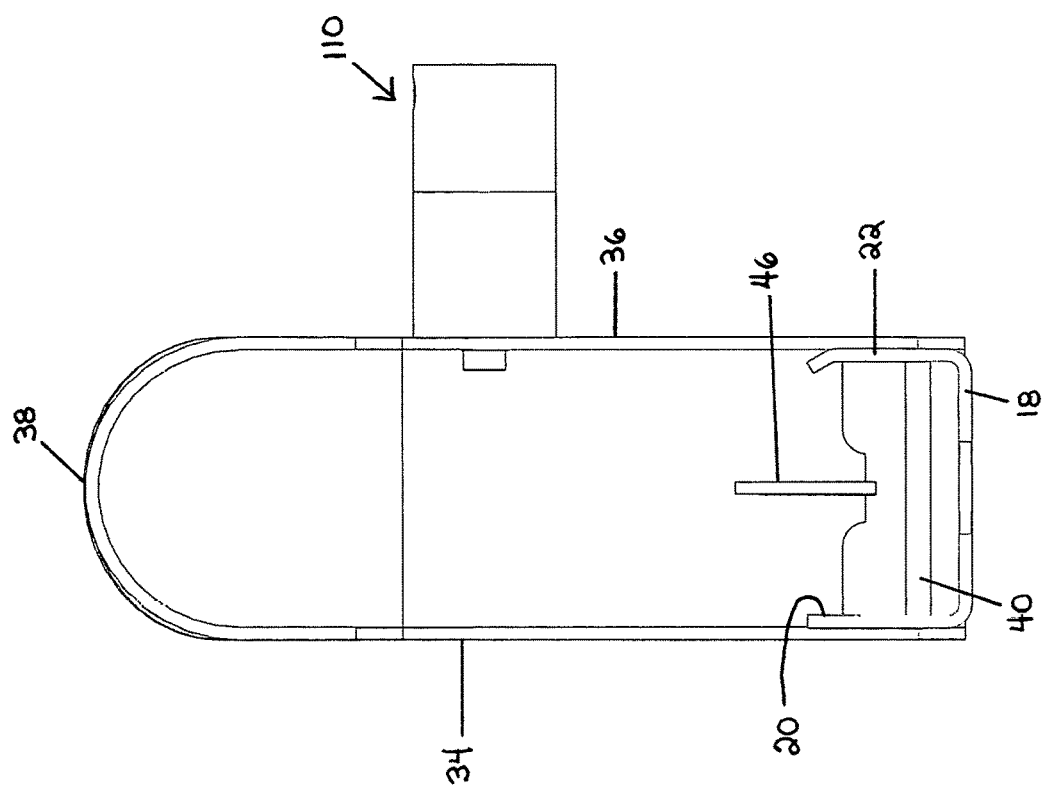
FIG. 1 is an end plan view of a security device according to an embodiment of the present invention.
Figure 2:
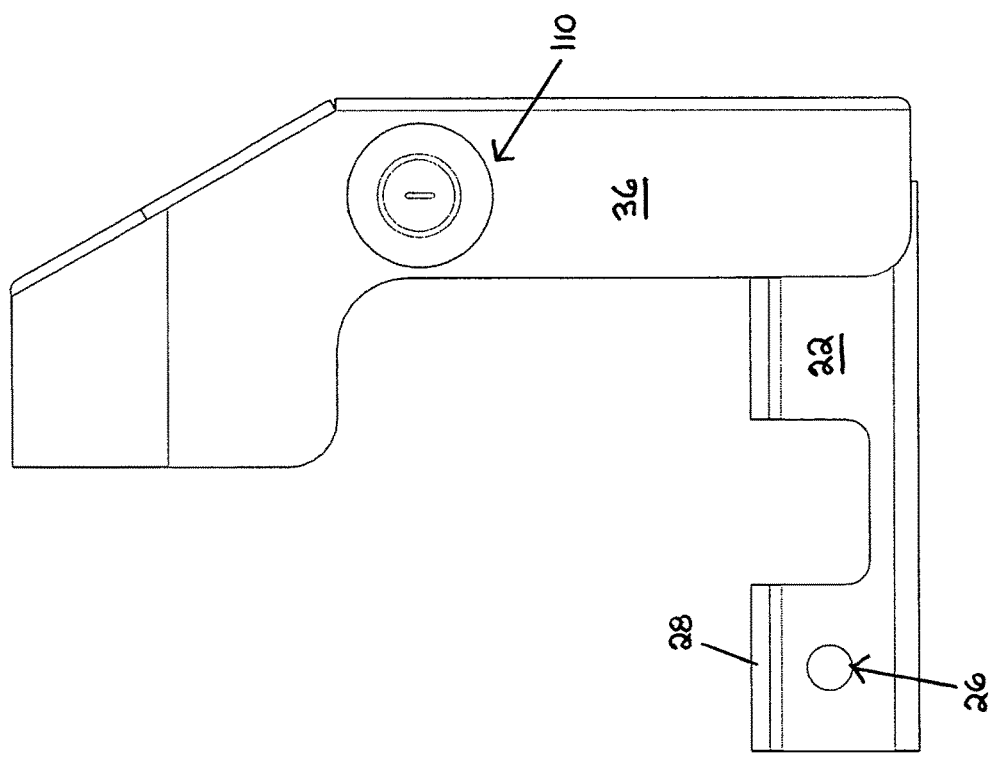
FIG. 2 is a side elevational view thereof.
Figure 3:
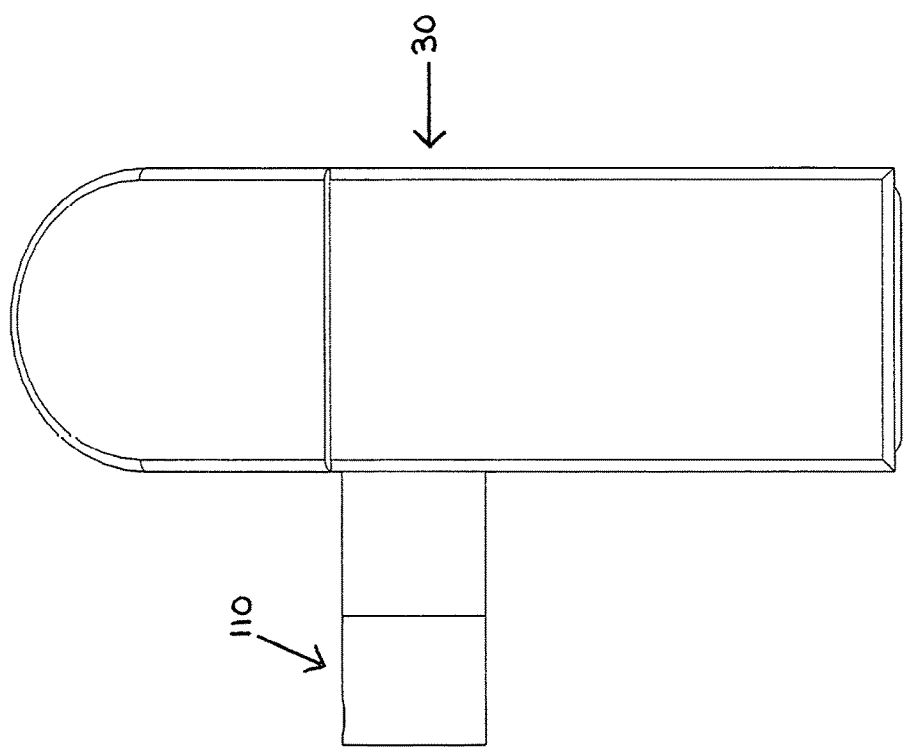
FIG. 3 is a top plan view thereof.
Figure 4:
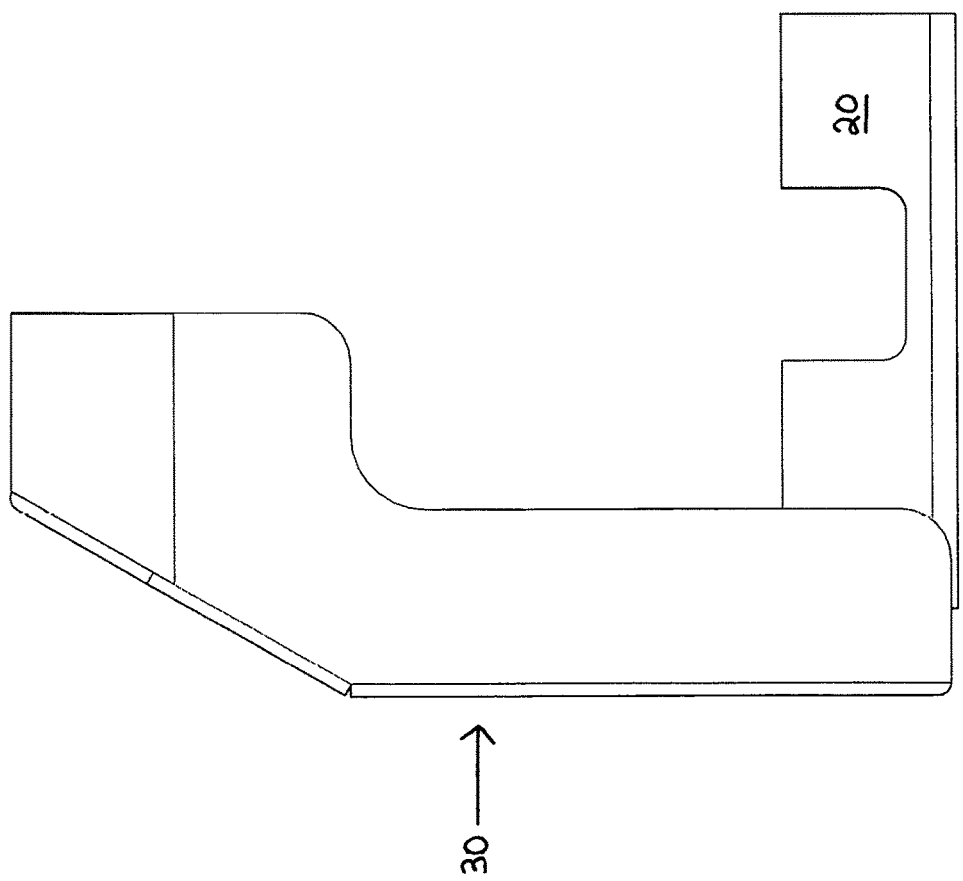
FIG. 4 is a side elevational view of the security device in an open position.
Figure 5:
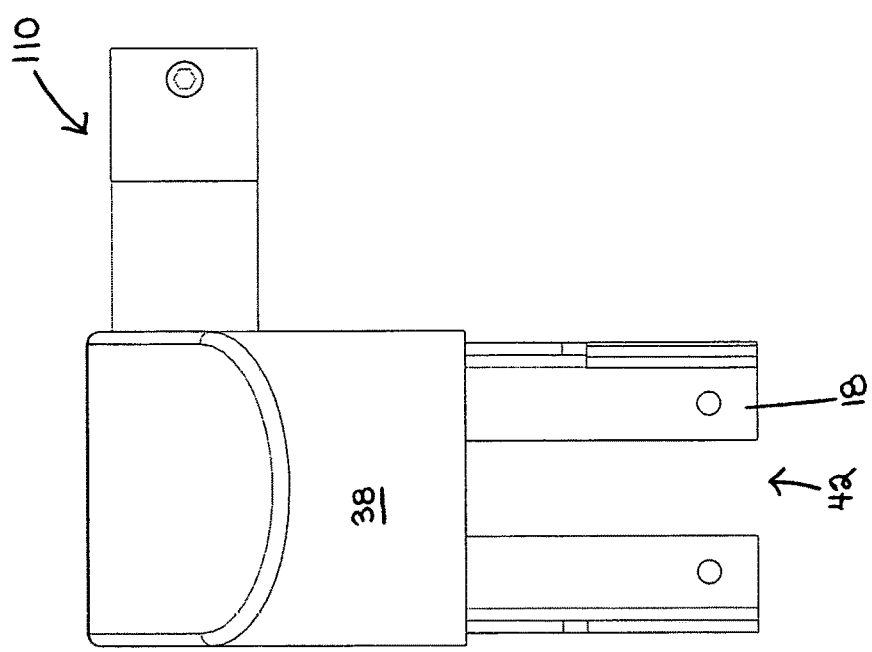
FIG. 5 is a top plan view of the device in an open position.

Referring to the drawings in greater detail and by reference characters thereto, there is illustrated a security device which is generally designated by reference numeral 10.

Security device 10 is designed to be used with a tow bar or hitch 12 and a ball receptor 14. Security device 10 includes a base generally designated by reference numeral 16 and which includes a base plate 18. Base plate 18 has a first side wall 20 extending upwardly therefrom with a second parallel side wall 22 likewise extending upwardly therefrom.

Second side wall 22 has a portion thereof which is upright and designated by reference numeral 24. Positioned within upright portion 24 is an aperture 26. Above aperture 26, upright portion has an angled upper portion 28.

A cover is generally designated by reference numeral 30 and includes a top wall 32, a first side wall 34 and a second side wall 36. Front wall 38 is designed to extend over ball receptor 14. The entire cover is hingedly connected to base 16 by means of a hinge 40.

Figure 11:
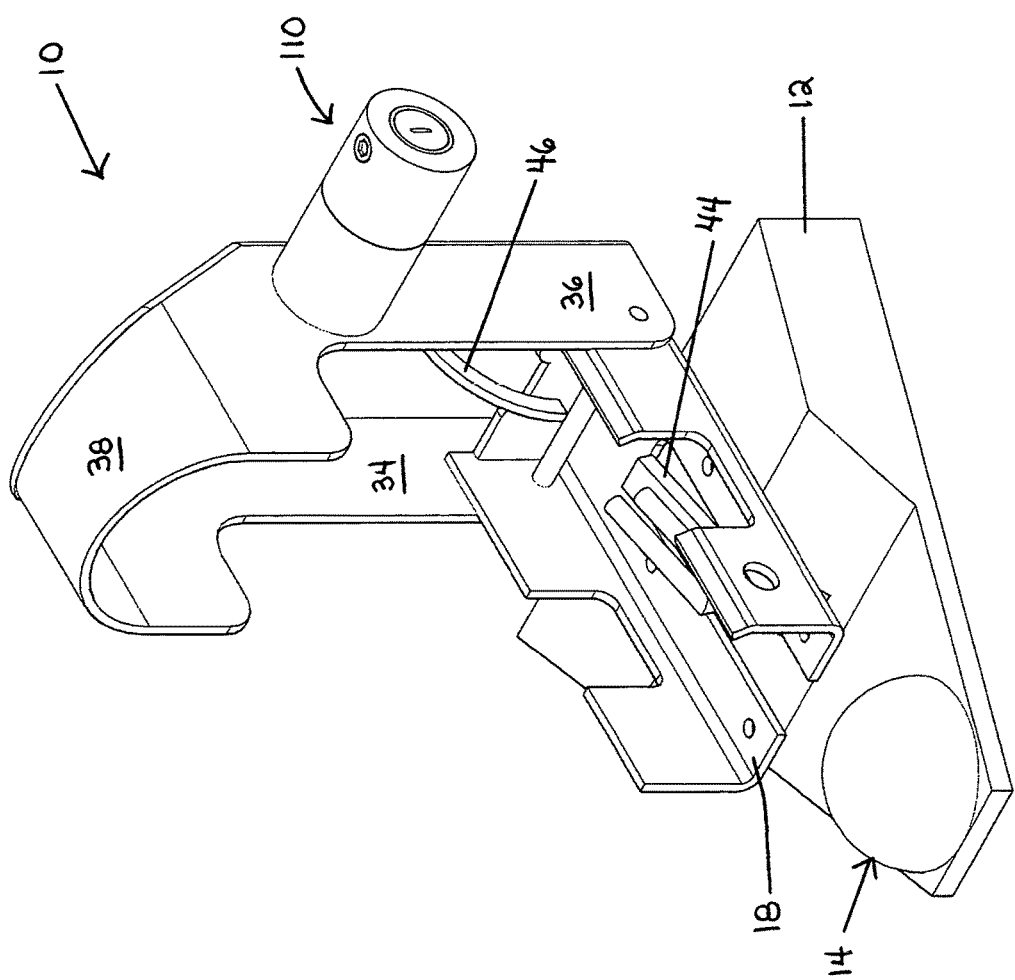
FIG. 11 is an exploded view of the device and a trailer hitch.
Figure 12:
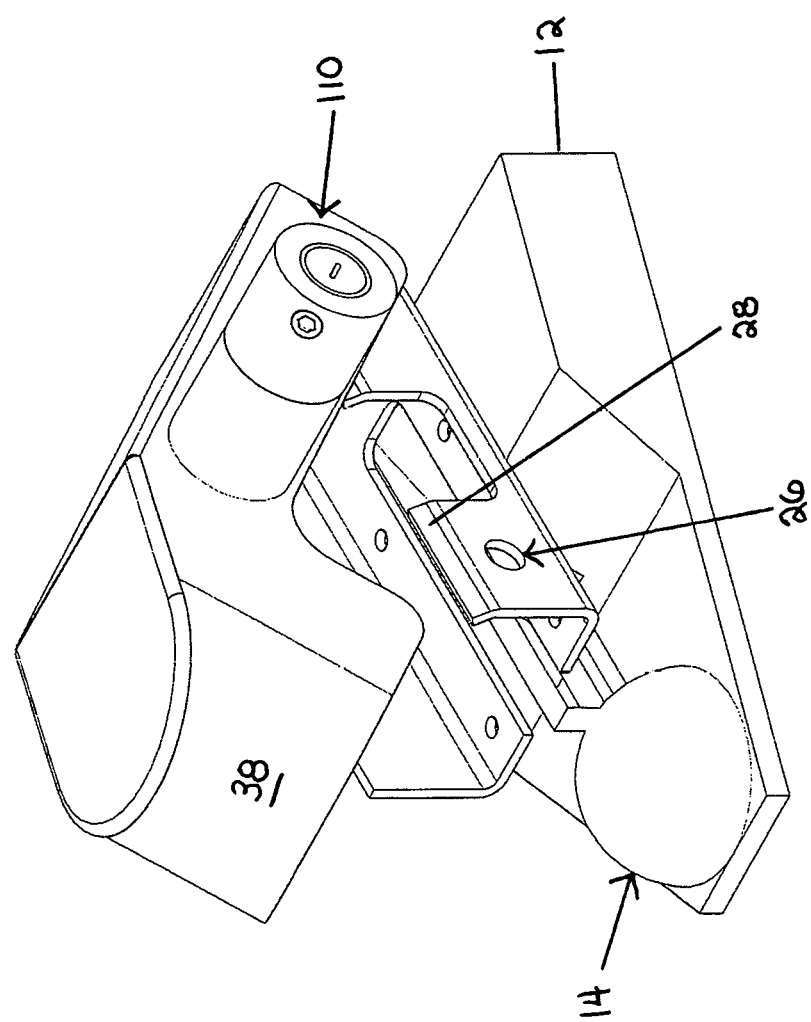
FIG. 12 is a perspective view of the trailer hitch and security device in a partially open position.
Figure 16:
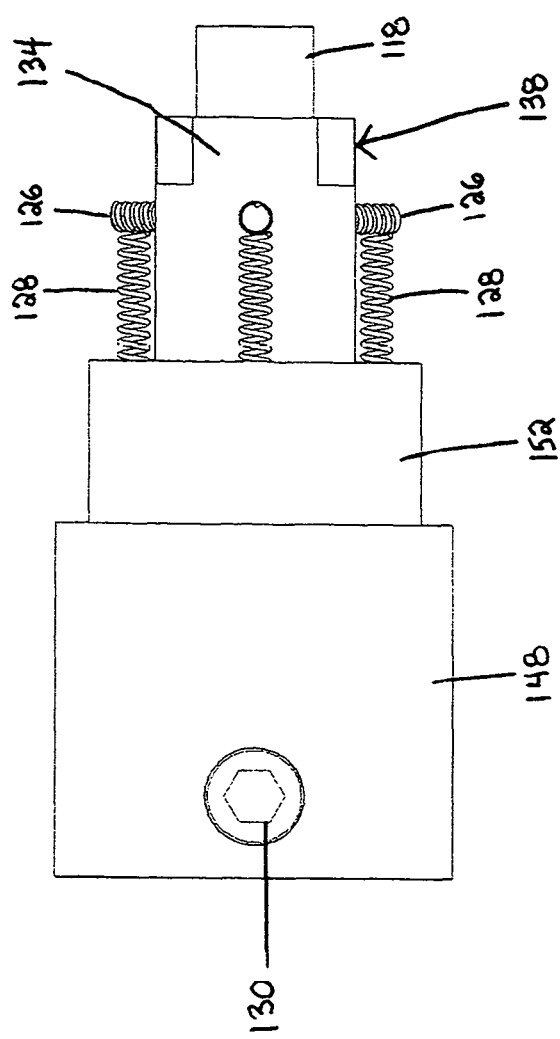
FIG. 16 is a side elevational view of a locking assembly of the security device.
Figure 17:
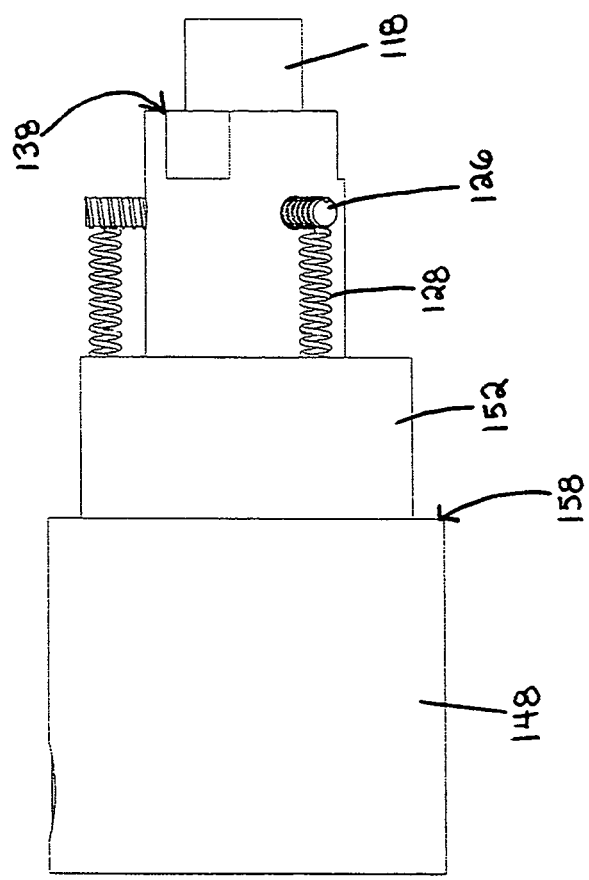
FIG. 17 is a further side elevational view of the locking assembly.
Figure 18:
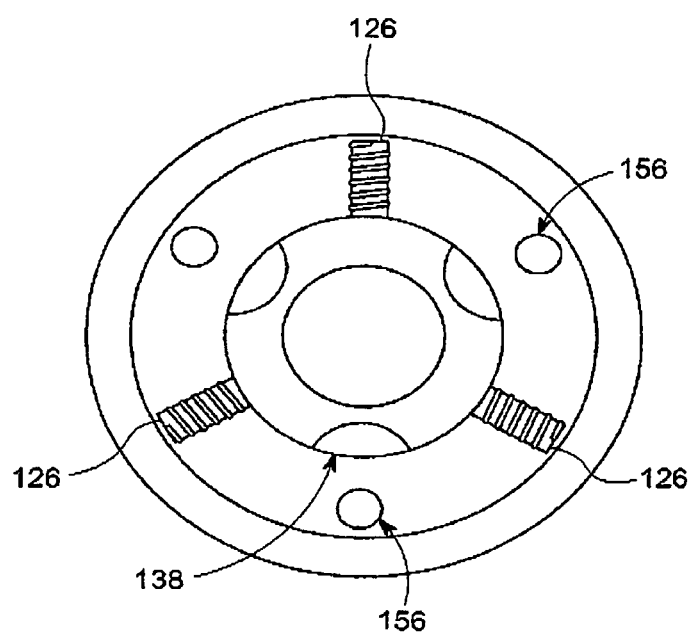
FIG. 18 is an end elevational view thereof.
Figure 19:
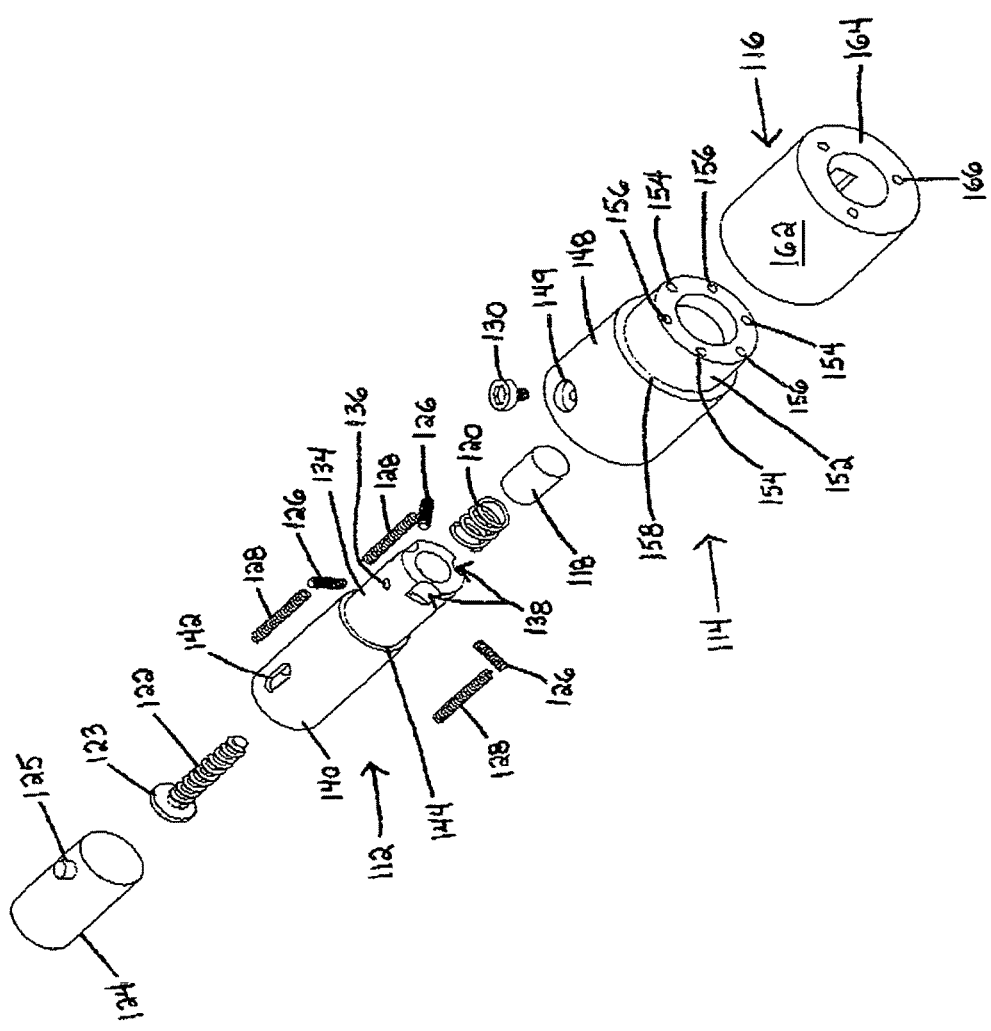
FIG. 19 is an exploded view of the locking assembly.
Figure 20:
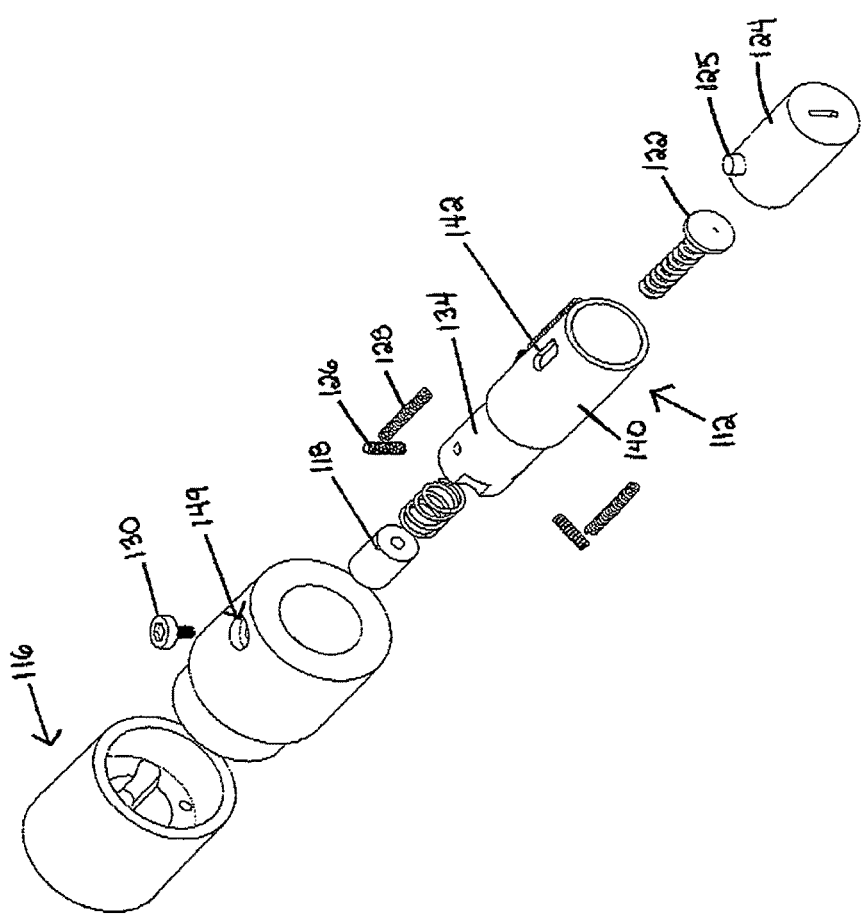
FIG. 20 is a further exploded view of the locking assembly.
Figure 21:
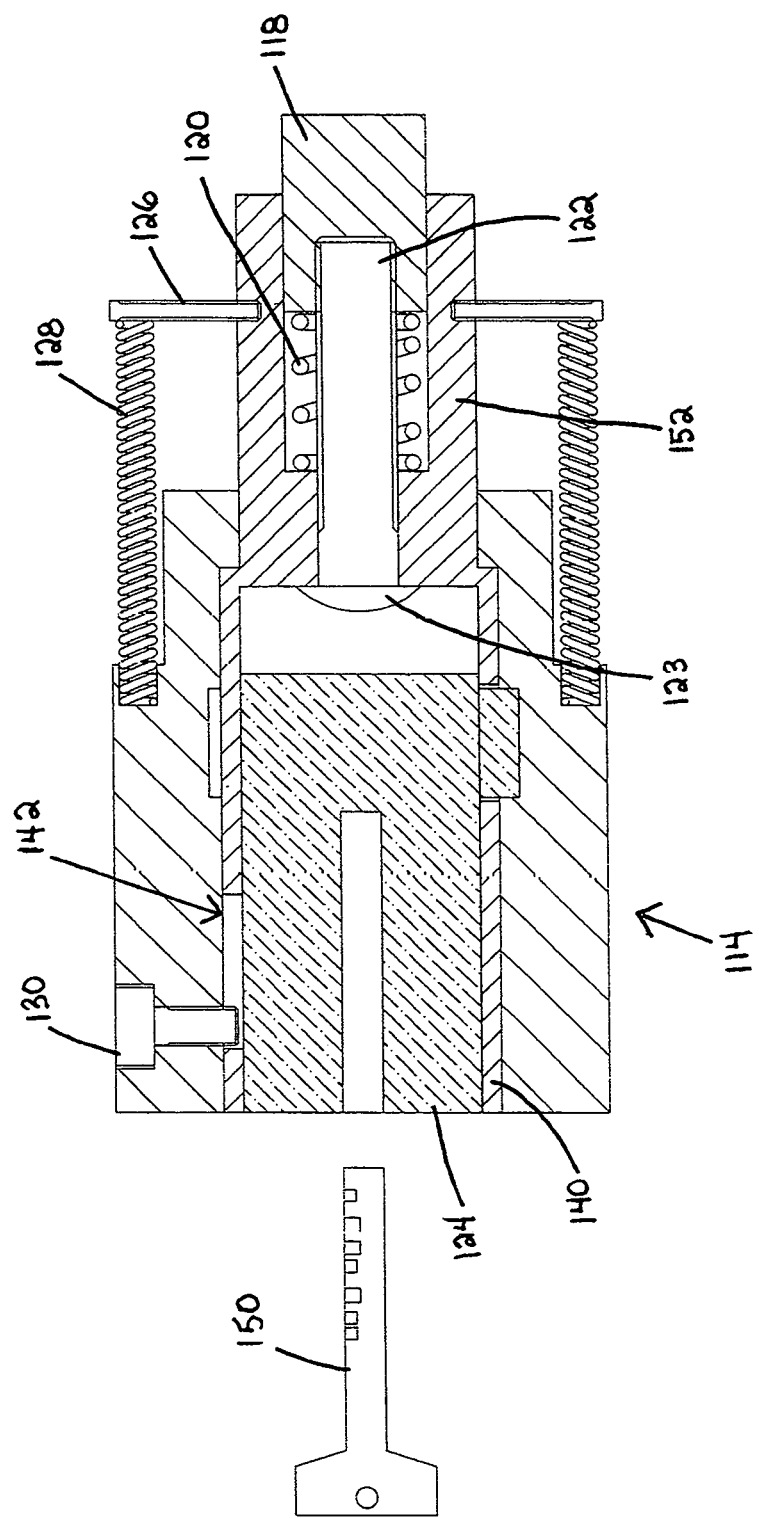
FIG. 21 is a side sectional view of the locking assembly in a locked position.
Figure 22:
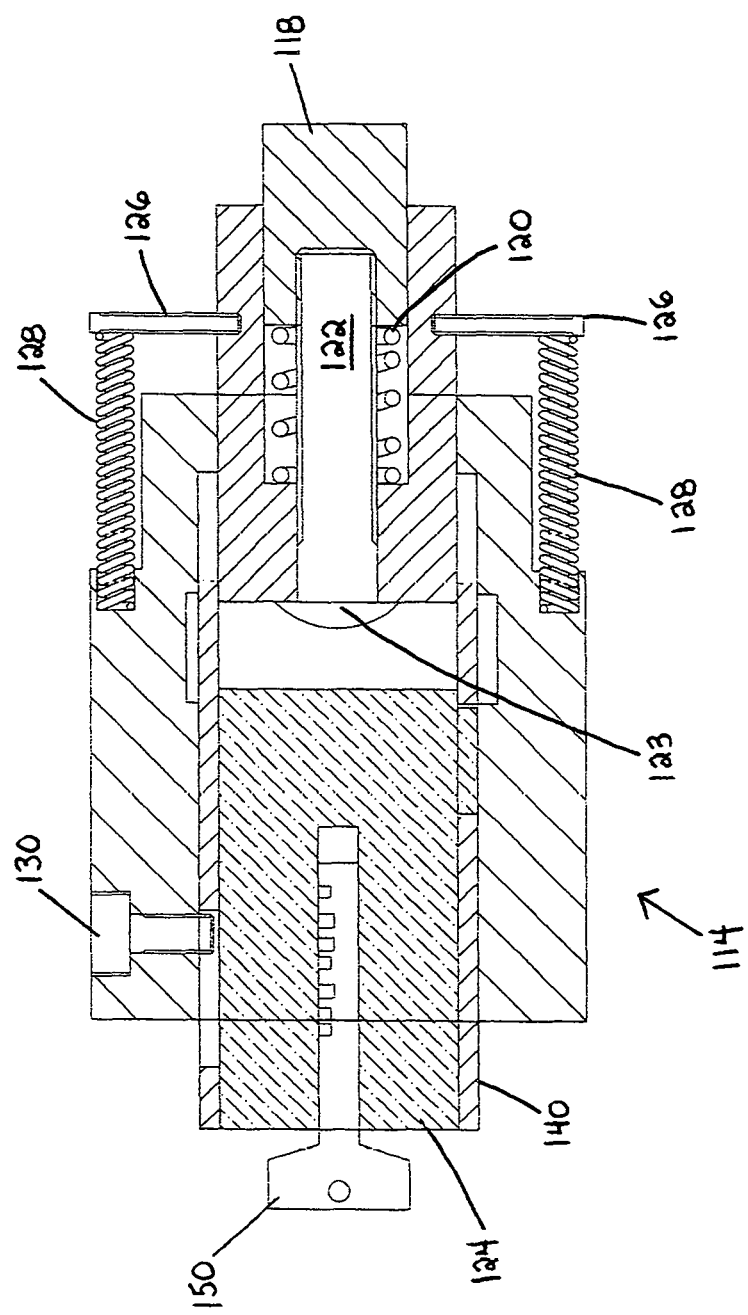
FIG. 22 is a cross sectional view of the locking assembly in an unlocked position.

As may be seen in FIG. 11, base plate 18 is provided with a slot 42 formed therein. Slot 42 is designed such that latch or lever 44 of the hitch coupler may extend upwardly within base 16. In order to ensure that latch or lever 44 is in the closed position, the security device includes a latch closing member 46 which is designed to engage latch 44 to close the same when the cover is lowered to the locked position. Preferably, latch closing member 46 is formed as an arcuate rod.

A lock assembly generally designated by reference numeral 110 is mounted within side wall 36.

Lock assembly 110 includes an inner housing generally designated by reference numeral 112, an outer housing generally designated by reference numeral 114, and a cover generally designated by reference numeral 116.

Lock assembly 110 also includes a plunger 118 and a plunger biasing spring 120. Lock assembly 110 includes a screw 122 and a lock cylinder 124 which has a protrusion 125 extending radially outwardly.

Lock assembly 110 uses screws 126 (three being shown) and three coil springs 128. A screw 130 is provided for reasons which will be discussed hereinbelow.

Inner housing 112 has an upper portion 134 which has a plurality of threaded apertures. There are also provided recesses 138 formed in the side of upper portion 134. Inner housing 112 also includes a lower portion 140 which has a slot 142 formed therein. It will be noted that there is provided a shoulder 144 between upper portion 134 and lower portion 140.

Outer housing 114 has a lower portion 148 which has a threaded aperture 149 to receive screw 130. An upper portion 152 has a plurality (three) of threaded apertures formed in the end thereof. Interspersed between threaded apertures 154 are recesses 156. Again, a shoulder 158 is formed between lower portion 148 and upper portion 152.

Cover 116 has a cylindrical body 162 with an end wall 164 having recesses 166 formed therein. Recesses 166 are designed to allow screws 168 to pass therethrough.

Figure 6:
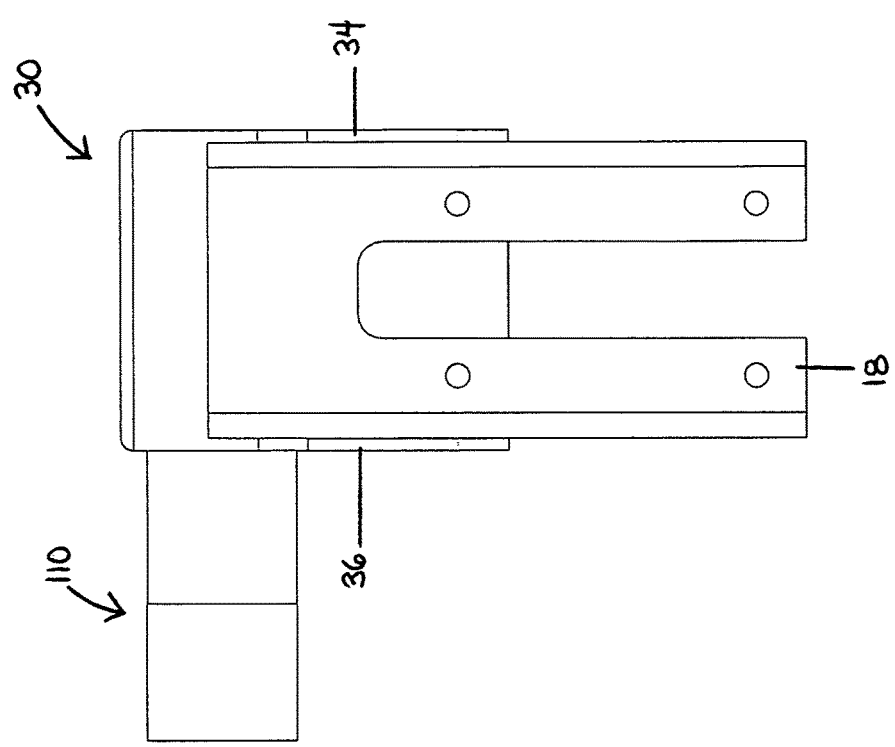
FIG. 6 is a bottom plan view thereof.
Figure 7:
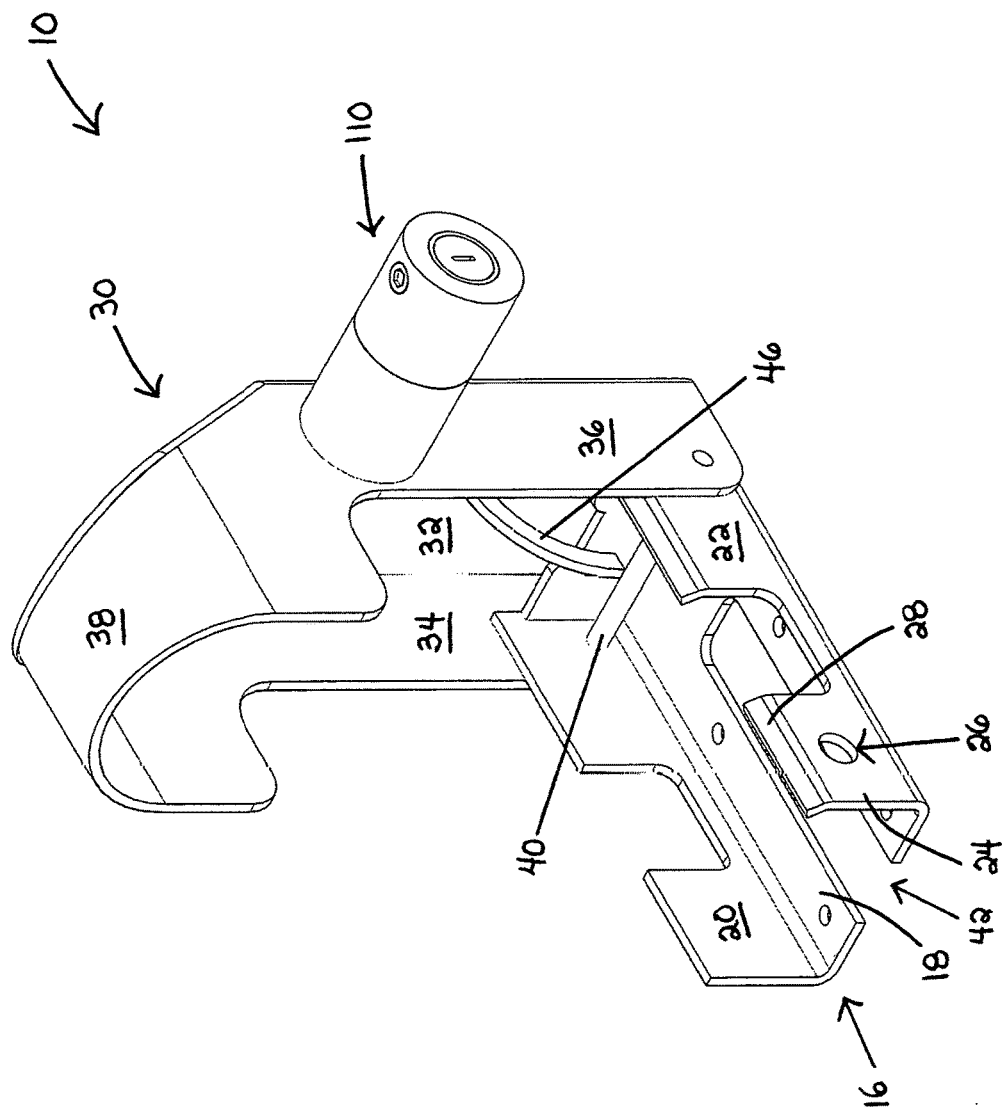
FIG. 7 is a perspective view thereof when in an open position.
Figure 8:
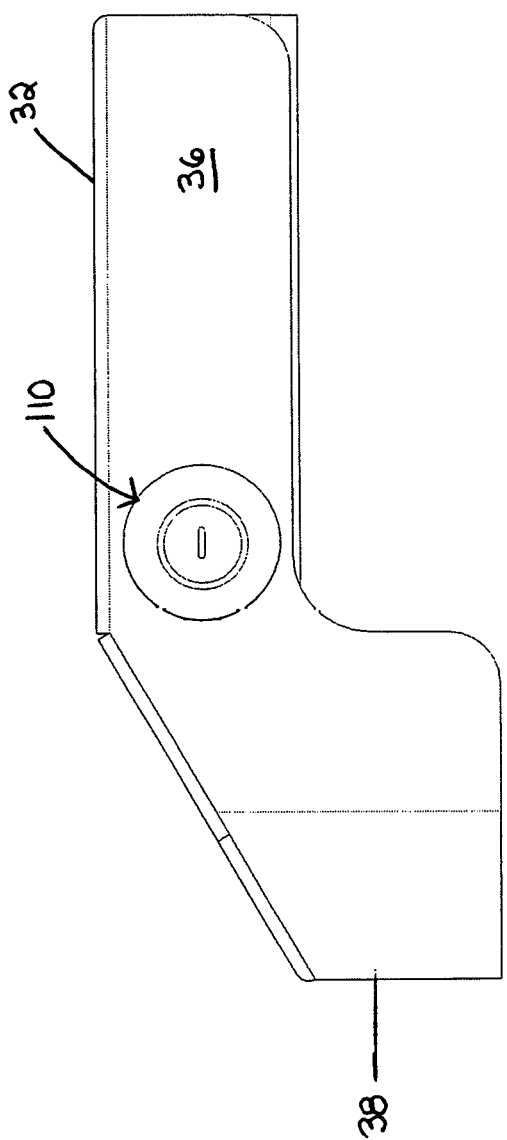
FIG. 8 is a side elevational view of the security device in a closed position.
Figure 9:
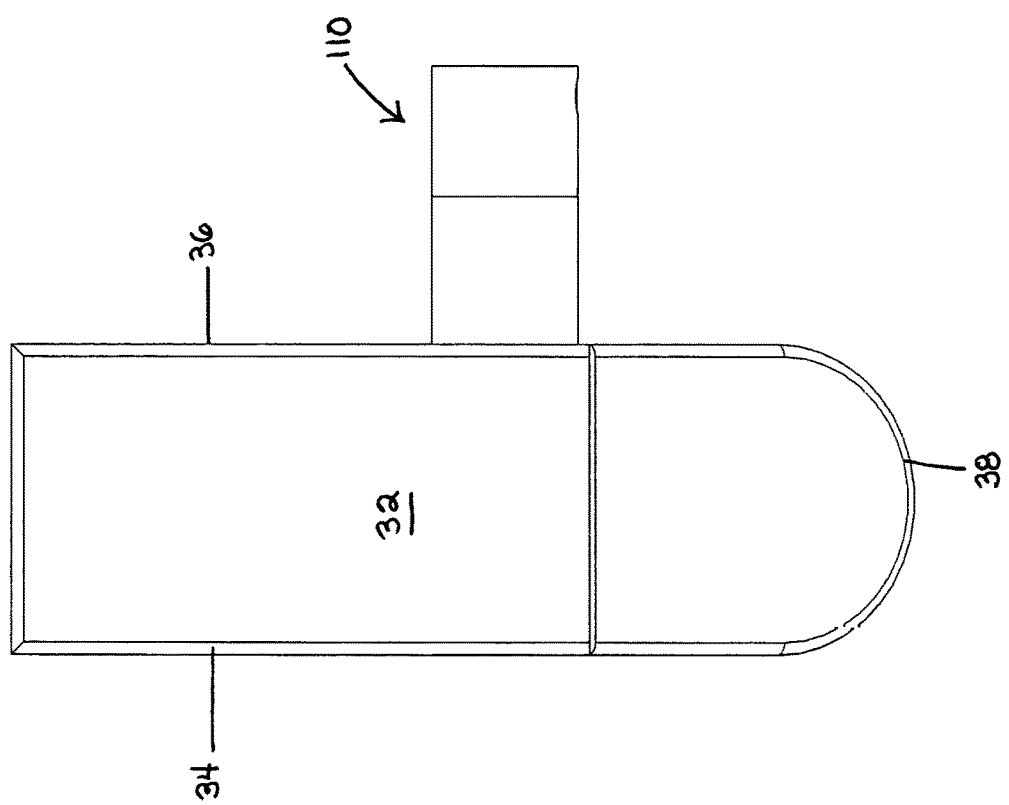
FIG. 9 is a top plan view of the security device in a closed position.
Figure 10:
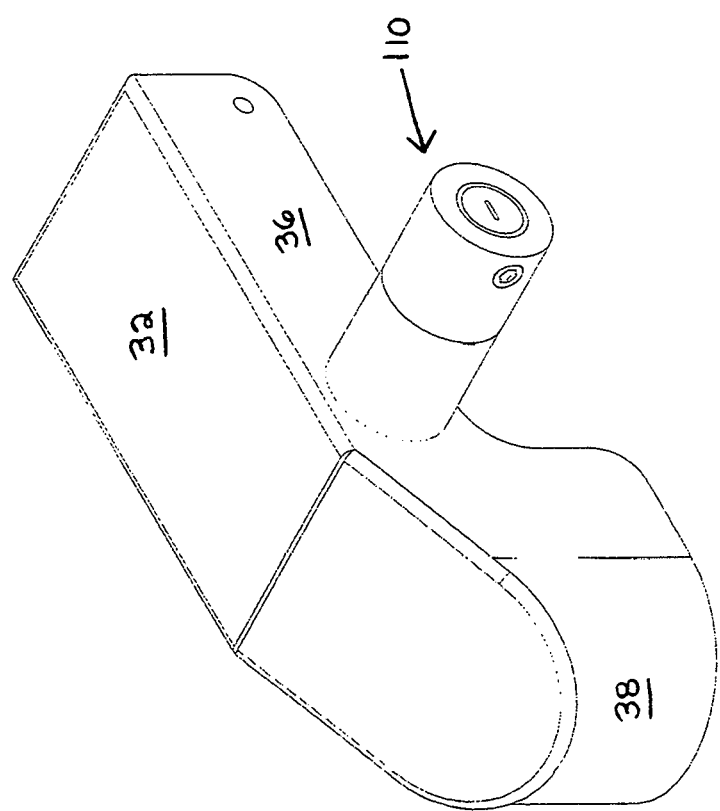
FIG. 10 is a perspective view of the security device in a closed position.

As may be seen in FIGS. 6 and 7, lock assembly 110 is assembled such that screw 122 is screw threadably engaged with plunger 118. Plunger spring 120 is biased between plunger 118 and the interior of upper portion 134 of inner housing 112. Screw head 123 abuts upper portion 134.

Inner housing 112 fits within outer housing 114 and the two housings are biased against each other by means of springs 128 abutting, at one end, screws 126 and recesses 156 in outer housing 114. As shown, screw 130 is engaged within slot 142 of inner housing 112. This limits the movement of inner housing 112 within outer housing 114.

In operation, as may be seen in the drawings, a key 150 may be inserted in lock cylinder 124. Rotation of the key will unlock the engagement of protrusion 125 from engagement with lower portion 148 of outer housing 114. However, protrusion 125 will still remain engaged with lower portion 140 of inner housing 112. Pulling on the key will cause outward movement of inner housing 112 with respect to outer housing 114. This retraction will also pull plunger 118 from engagement with an aperture in the device to thereby permit release of the plunger with the aperture. Removal of the key will then permit the device to still be locked.

Referring to FIGS. 14A to 14C and 15A to 15C, operation of the security device is illustrated. In FIG. 14A, cover 30 is in the fully open position. It is then moved downwardly to close the same as shown in FIG. 14B. Plunger 118 strikes or contacts angled upper section 28 which forces plunger 118 inwardly against plunger biasing spring 120. Continued movement, as shown in FIG. 14C, will result in plunger 118 entering aperture 26 in upright portion 24.

When opening the security device, key 150 is inserted and operated. The pulling of inner housing 112 retracts plunger 118 from its engagement with aperture 26 in upright portion 24. This permits the opening of the cover in the position shown in FIG. 15C. Any time when the cover is in the opened position, key 150 may be removed and the locking may be effectuated as shown in FIGS. 14A to 14C.

It is to be noted that latch closing member 46 will engage with lever 44 as it closes to ensure that latch 44 is moved to the closed or locked position.

It will be understood that the above described embodiment is for purposes of illustration only and that changes and modifications may be made thereto without departing from the spirit and scope of the invention.

I claim:

1. A security device for a trailer hitch which includes a ball receptor comprising:
 a base plate;
 a deflector secured to said base plate, said deflector having an aperture formed therein, said deflector having an inwardly directed upper portion;
 a cover hingedly connected to said base plate, said cover being movable between an open position permitting access to said ball receptor, and a closed position denying access to said ball receptor;
 a locking device mounted to said cover, said locking device including a housing, a plunger mounted within said housing, said plunger being movable between an extended position and a retracted position, said plunger being spring biased to said extended position; and
 said locking device being located such that said plunger enters said aperture when said covet is in a closed position.

2. The security device of claim 1 wherein said locking device includes a key operated push-pull lock.

3. The security device of claim 2 wherein said cover is formed of a stainless steel material.

4. The security device of claim 1 wherein said base plate has a slot to permit access to a trailer hitch lever for closing said trailer hitch.

5. The security device of claim 1 wherein said deflector forms a portion of a side wall connected to said base plate.

6. The security device of claim 1 wherein said cover has a top wall and first and second side walls, said locking device being mounted in said first side wall.

7. The security device of claim 1 wherein said device further includes a closing member, said closing member being located interiorly of said cover, said closing member being positioned to contact a locking lever on said ball receptor.

* * * * *